United States Patent [19]

Schoofs

[11] 4,310,733

[45] Jan. 12, 1982

[54] ARRANGEMENT FOR APPLYING SIGNALS TO A TELEPHONE LINE

[75] Inventor: Franciscus A. C. M. Schoofs, Eindhoven, Netherlands

[73] Assignee: U.S. Philips Corporation, New York, N.Y.

[21] Appl. No.: 147,973

[22] Filed: May 8, 1980

[30] Foreign Application Priority Data

May 28, 1979 [NL] Netherlands .................. 7904159

[51] Int. Cl.³ ............................................. H04B 3/58
[52] U.S. Cl. .......................................... 179/170 NC
[58] Field of Search ....... 179/170 R, 170 D, 170 NC, 179/81 R, 81 B, 84 R, 18 FA, 18 F, 16 F, 18 GF

[56] References Cited

U.S. PATENT DOCUMENTS 4,113,996 9/1978 Sanderson .................. 179/170 NC
4,192,978 3/1980 Vincent ...................... 179/170 NC

OTHER PUBLICATIONS

Coenders, Dijtzmans and Schoofs: "A System with Electronic Line Circuits and Integrated Cross-points", IEE Conference Pub'h. No. 163, Apr. 1978, p. 132+.

*Primary Examiner*—Thomas A. Robinson
*Attorney, Agent, or Firm*—Thomas A. Briody; William J. Streeter; Laurence A. Wright

[57] ABSTRACT

Arrangement for applying signals to a two-wire telephone line, comprising two line control circuits each comprising a fed-back amplifier circuit. According to the invention the amplifier circuits are constructed from an input stage constituted by an operational amplifier, a transistor arranged as a voltage amplifier (intermediate stage), and a power output stage which is in the form of a push-pull amplifier. The line control circuits can either receive the control signals with an opposite polarity or they can both receive the same control signal, one line control circuit being used as an inverting and the other as a non-inverting amplifier.

5 Claims, 7 Drawing Figures

FIG.2

ARRANGEMENT FOR APPLYING SIGNALS TO A TELEPHONE LINE

BACKGROUND OF THE INVENTION

The invention relates to an arrangement for applying signals to a two-wire telephone line, comprising two line control circuits, each having an input for receiving the signals to be applied to the telephone line and each having an output to which two line resistors are connected for connecting the respective outputs to a wire of the telephone line.

DESCRIPTION OF THE PRIOR ART

Such an arrangement is known from the article "A system with electronic line circuits and integrated crosspoints" published in "IEEE Conference Publication Number 163" of the "International Conference on Private Electronic Switching Systems 10–12 April 1978 London" pages 132–136.

This known arrangement comprises two line control circuits, each one of which is constituted by an operational amplifier for high voltages, and line resistors connected to the output of each line control circuit. This arrangement has the advantage that it is of an entirely electronic construction and that it can be integrated, whereas, furthermore, a low output impedance of the line control circuit can be obtained, so that the desired equality of the line terminating impedances is exclusively determined by the line resistors.

For the application of signals to the telephone line it must be possible for the output voltage of the line control circuit to vary between 0 V and −60 V at a current of approximately 100 mA. For the application of ringing signals a voltage of, for example, 150 V at a current of approximately 20 mA may even be required. In practice it appeared that integrated amplifier circuits for such high voltages cannot be constructed in an easy way.

The invention has for its object to provide an arrangement of the type defined in the opening paragraph, which is capable of applying high voltages to the telephone line in a simple way, while yet retaining the above-mentioned advantages of the known arrangement.

SUMMARY OF THE INVENTION

The arrangement according to the invention is therefore characterized in that each line control circuit comprises an amplifier circuit having an input stage constituted by an operational amplifier, an intermediate stage constituted by a transistor which is arranged as a voltage amplifier, the intermediate stage being coupled to an output of the operational amplifier, also comprising a power output stage which includes two complementary transistor circuits in a push-pull configurtion for connection between the terminals of a d.c. voltage source and which comprises a feedback circuit from an output of the power output stage to an input of the operational amplifier.

BRIEF DESCRIPTION OF THE DRAWINGS

Embodiments of the arrangement according to the invention will now be further explained with reference to the drawing in which:

FIG. 2 shows a further embodiment of the arrangement according to the invention.

In the Figures corresponding elements are given the same reference numerals.

DESCRIPTION OF THE PREFERRED EMBODIMENT

Figure 1:
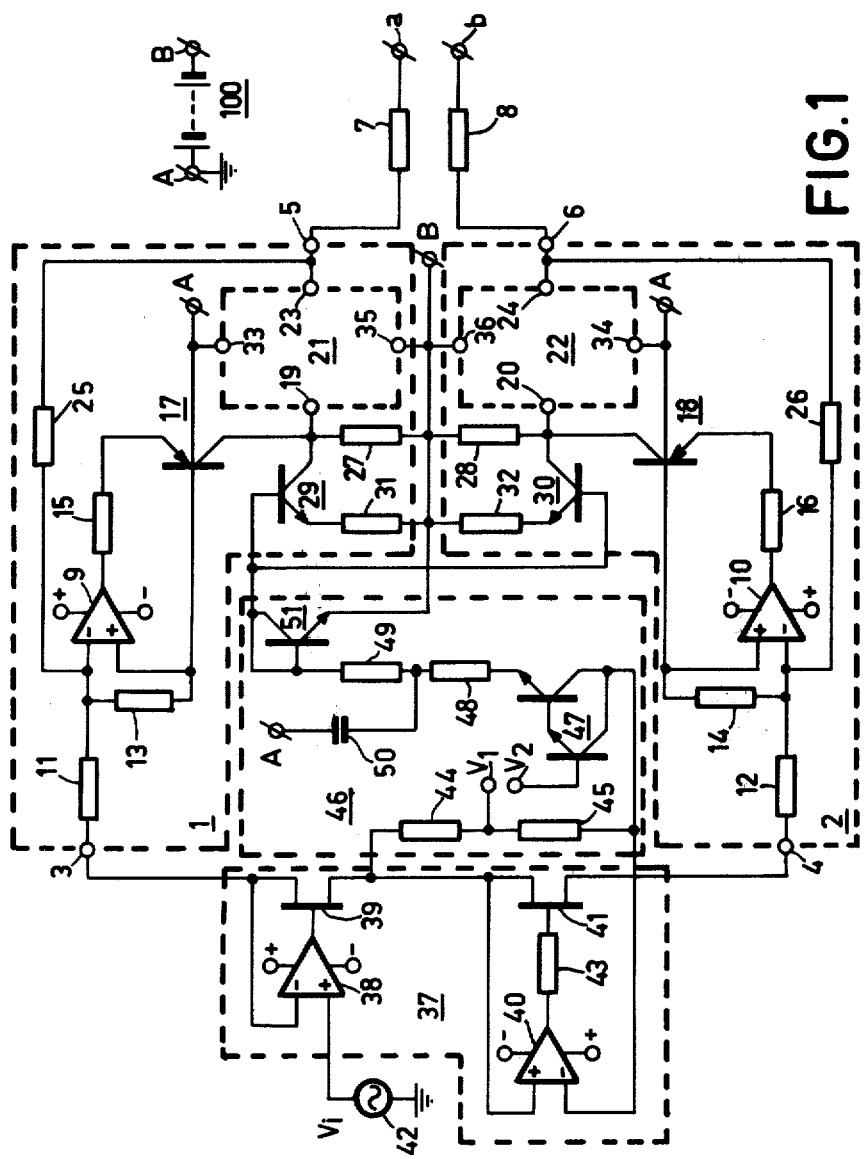
FIG. 1 shows a first embodiment of the arrangement according to the invention.
Figure 3A:
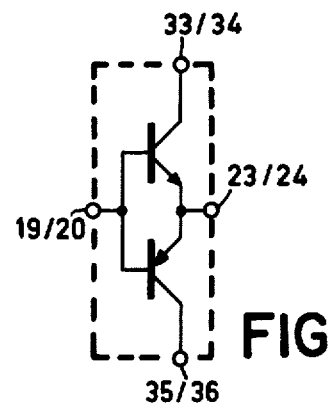
FIGS. 3A to D show a number of possible embodiments of a power output stage for use in the arrangement according to the invention.
Figure 3B:
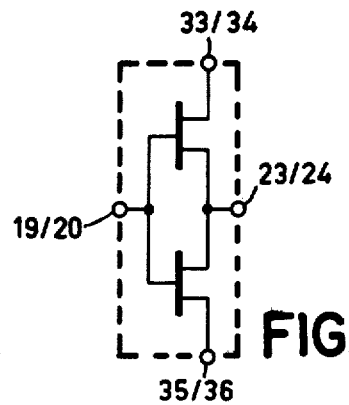
Figure 3C:
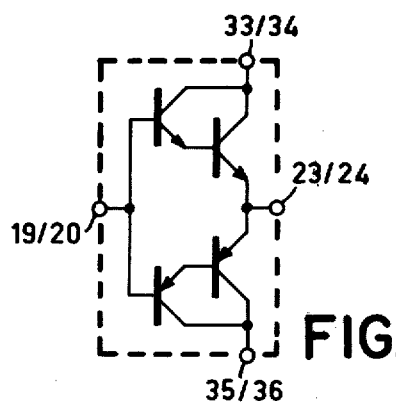
Figure 3D:
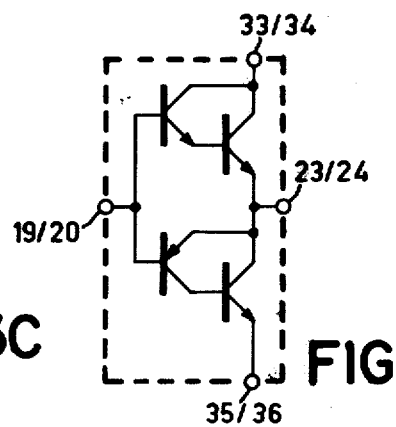

The arrangement shown in FIG. 1 comprises two line control circuits 1 and 2 having an input 3 and 4, respectively, and an output 5 and 6, respectively. Output 5 of line control circuit 1 is connected to the a-wire of a two-wire telephone line via a line resistor 7 and output 6 of line control circuit 2 is connected to the b-wire via a line resistor 8. Each one of the line control circuits 1 and 2 comprises an operational amplifier 9 and 10, respectively, whose non-inverting inputs are connected to a reference potential which is formed in this embodiment by the grounded positive terminal A of the d.c. voltage source 100 and whose inverting inputs are connected to the inputs 3 and 4, respectively, via resistors 11 and 12, respectively, and also to the non-inverting inputs via resistors 13 and 14. Via resistors 15 and 16 the outputs of the operational amplifiers 9 and 10 are connected to the emitters of two pnp transistors 17 and 18, respectively, in grounded-base connection. The collectors of these pnp transistors are connected to inputs 19 and 20 of two power output stages 21 and 22, respectively, whose outputs 23 and 24 are connected to the outputs 5 and 6, respectively, of the line control circuits 1 and 2. Each one of the outputs 23 and 24 is connected to the inverting inputs of the operational amplifiers 9 and 10, respectively, via a feedback resistor 25 and 26, respectively.

The parallel arrangement of a resistor 27 and 28, respectively, and a current source which is formed by npn transistors 29 and 30, respectively, and a resistor 31 and 32, respectively, included in the emitter circuit thereof, is provided between the input terminals 19 and 20, respectively, of the power output stages 21 and 22 and the negative terminal B of the d.c. voltage source 100.

The power output stages 21 and 22 have a supply terminal 33 and 34, respectively, which is coupled to the positive terminal A, and a supply terminal 35 and 36, respectively, which is connected to the negative terminal B.

In order to apply signals to the a-wire and the b-wire of a telephone line by means of the above-described arrangement, currents of equal amplitude but of opposite phase are applied to the inputs 3 and 4 of the line control circuits 1 and 2, respectively. Said currents are produced bvy an input circuit 37 which is formed by a first voltage-current converter consisting of an operational amplifier 38 and an n-channel FET 39 and by a second voltage-current converter having an operational amplifier 40 and an n-channel FET 41. An input voltage Vi, which characterizes the signal required for the telephone line, is applied to the non-inverting input of the operational amplifier 38 by a voltage source 42. The inverting input is connected to the source-region of FET 39 and to the input 3 of line control circuit 1 and the output is connected to the gate of FET 39. The drain-region of FET 39 is connected to the drain-region of FET 41 and to the non-inverting input of the operational amplifier 40. The output of operational amplifier 40 is connected to the gate of FET 41, via a resistor 43. Both the inverting input and the non-inverting input of the operational amplifier 40 are connected to a positive potential V1 via resistors 44 and 45, respectively. The resistors 44 and 45 form part of a reference circuit 46 which further includes a pair of transistors 47 arranged in a Darlington configuration, the base of which is connected to a positive reference potential V2. The collector of transistor 47 is connected to the inverting input of the operational amplifier 40 and the emitter is connected to a terminal of a npn transistor 51, which is connected as a diode, via a voltage divider consisting of the resistors 48 and 49, a centre tap of which is connected to the terminal A of the d.c. voltage source 100 via a capacitor 50. The other terminal of transistor 51 is connected to the negative terminal B of d.c. voltage source 100. The first-mentioned terminal of transistor 51 is also connected to the bases of the transistors 29 and 30 in the line control circuits 1 and 2.

In the embodiment shown here the two line control circuits 1 and 2 are identical and both function as inverting amplifiers whose gain factors are defined by $-R_{25}/R_{11}$ and $-R_{26}/R_{12}$, respectively. Herein $R_n$ represents the resistance value of the resistors having the reference numeral n. The operational amplifiers 9 and 10 are of the internal-frequency compensation type, for example of the well-known and widely available type μA 741. The frequency characteristic of this type is such that for 0dB gain the slope is $-6$ dB per octave. To ensure the stability of the control circuits the negative feedback factor ($R_{25}/R_{11}$ and $R_{26}/R_{12}$, respectively) must exceed the gain in the intermediate stage ($R_{27}/R_{15}$ and $R_{28}/R_{16}$, respectively). In addition, to compensate for parasitic capacitances, a low-value capacitor (for example 22 pF may be included in parallel with each of the resistors 25 and 26.

In a practical embodiment the value of the resistors is as follows:

$R_7 = R_8 = 300 \, \Omega$ $R_{11} = R_{12} = 2 \, k\Omega$ $R_{13} = R_{14} = 2 \, k\Omega$ $R_{15} = R_{16} = 2.2 \, k\Omega$ $R_{25} = R_{26} = 30 \, k\Omega$ $R_{27} = R_{28} = 27 \, k\Omega$ $R_{31} = R_{32} = 600 \, \Omega$ $R_{43} = 1 \, k\Omega$ $R_{44} = R_{45} = 1 \, k\Omega$ $R_{48} = R_{49} = 30 \, k\Omega$ It should be noted that the shown field effect transistors may alternatively be replaced by other semi-conductor elements, for example Darlington transistors.

Figure 2:
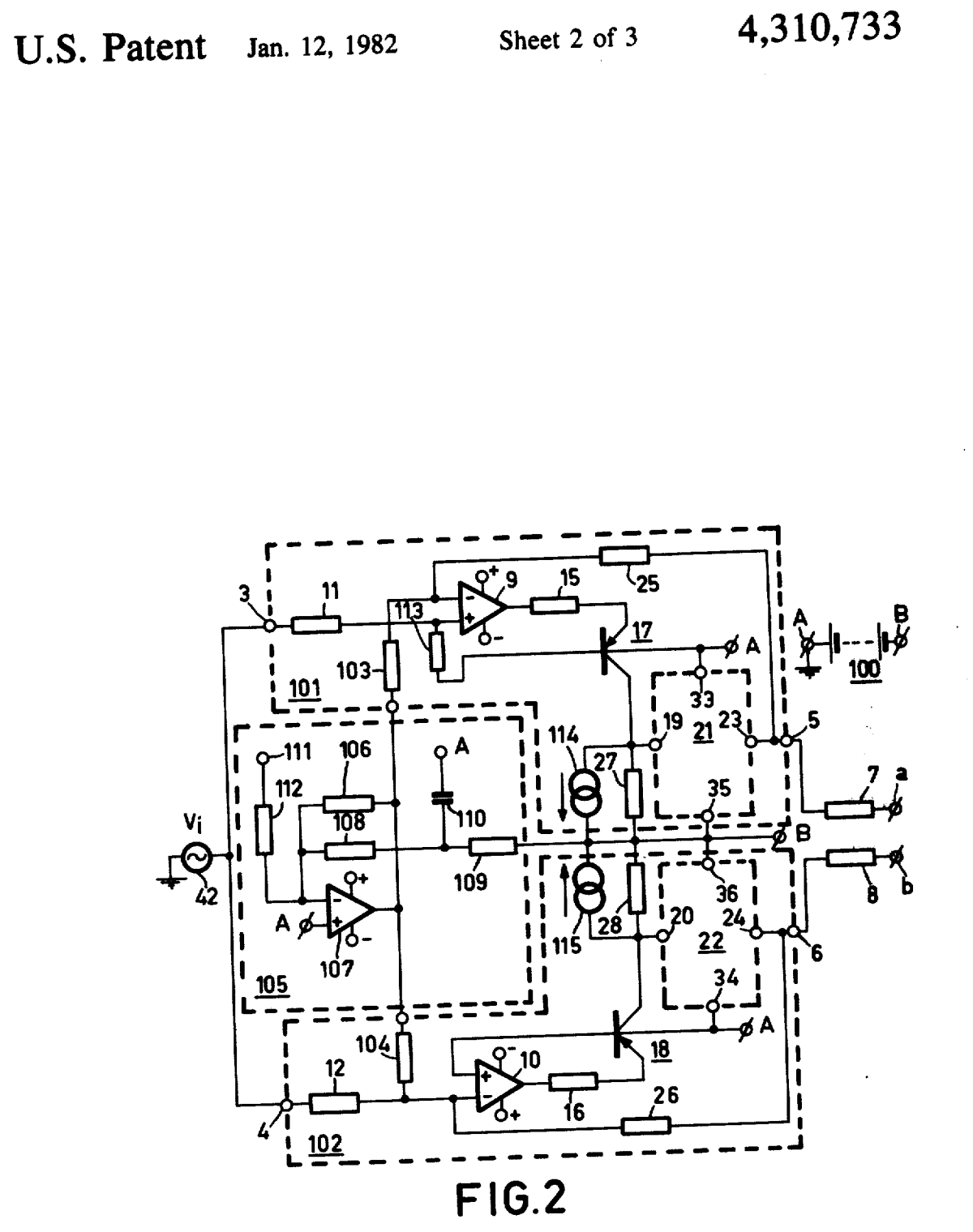

The arrangement shown in FIG. 2 comprises a first line control circuit 101 which functions as a non-inverting amplifier, and a second line control circit 102, which functions as an inverting amplifier. A reference voltage source 105 comprising an operational amplifier 107 which is negatively fed back via a resistor 106, is connected to the inverting inputs of the operational amplifiers 9 and 10 via resistors 103 and 104, respectively. The output of this reference voltage source 105 is constituted by the output of the operational amplifier 107, whose non-inverting input is connected to the positive terminal A, and the inverting input to the negative terminal B of d.c. voltage source 100 via the resistors 108 and 109. The junction of the resistors 108 and 109 is connected to terminal A via an isolating capacitor 110. A "common-mode" signal can be applied to the a-wire and the b-wire of the telephone line, for example for testing purposes, via a terminal 111 and a resistor 112.

The non-inverting input of operational amplifier 9 is connected to the terminal A via a resistor 113, the non-inverting input of operational amplifier 10 being directly connected to this terminal A.

In a practical embodiment the resistors which have not been mentioned in the description of FIG. 1 have the following values $R_{103} = R_{104} = 2 \, k\Omega$ $R_{106} = 2 \, k\Omega$ $R_{108} = R_{109} = 30 \, k\Omega$ $R_{112} = 30 \, k\Omega$ $R_{113} = 30 \, k\Omega$ The voltages at the outputs 5 and 6 of line control circuits 101 and 102 can be described as follows:

$$V_5 = -\frac{R_{25}}{R_{103}} \cdot V_r + \frac{R_{113}}{R_{11} + R_{113}} \cdot \frac{R_{25} + R_{103}}{R_{103}} \cdot V_i$$

and $$V_6 = -\frac{R_{26}}{R_{104}} \cdot V_r - \frac{R_{26}}{R_{12}} \cdot V_i$$

wherein $V_r$ is the output voltage of the reference voltage source 105. For Vr it holds, when the "common-mode" signal at terminal 111 is represented by $V_c$ that:

$$V_r = \frac{-R_{106}}{R_{108} + R_{109}} \cdot V_B - \frac{R_{106}}{R_{112}} \cdot V_c$$

wherein $V_B$ is the voltage difference between the terminals A and B of the d.c. voltage source 100. The resistance values being as indicated above it follows herefrom that:

$V_5 = \frac{1}{2} \cdot V_B + 15 \cdot V_i + V_c$ and $V_6 = \frac{1}{2} \cdot V_B - 15 \cdot V_i + V_c$ so that $V_5 - V_6 = 30 \cdot V_i$.

It should be noted that a current source 114 and 115, respectively, is connected between the input terminals 19 and 20, respectively, and the negative terminal B of the d.c. voltage source 100 to render it possible to bring the potential of these terminals 19 and 20, respectively, substantially to the potential of terminal B when a line current flows from terminal 23 to terminal 35 or from terminal 24 to terminal 36, respectively. The magnitude of this current source is determined by the maximum line current and the current gain factor of the power output stage. The presence of the current sources 114 and 115 renders it possible to replace each of the resistors 27 and 28 by a respective series arrangement of a resistor, having a lower resistance value, and a capacitor so that the power dissipated in those resistors is smaller and the time constant produced by the parasitic capacitances at the input terminals 19 and 20 is reduced at the same time. A further reduction of the dissipation can be attained by connecting this series arrangement to terminal A instead of to terminal B.

The FIGS. 3A to D show a number of possible embodiments of a power output stage having two complementary transistor circuits arranged in a push-pull configuration. The reference numerals correspond to the reference numerals shown in the FIGS. 1 and 2 are regards the power output stages 21 and 22.

Figure 4:
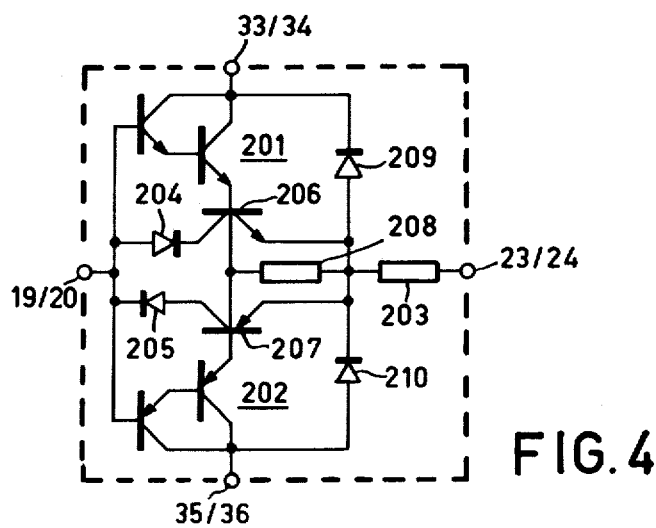
FIG. 4 shows a power output stage with current limitation for use in the arrangement according to the invention.

The power output stage shown in FIG. 4 comprises means for limiting the output current. To that end a positive temperature coefficient (PTC) resistor 203 is arranged between the interconnected emitters of the complementary Darlington circuits 201 and 202 and output terminal 23/24. Arranging the PTC-resistor before the output 23/24 does not influence the output impedance of the line control circuits as the impedance constituted by the PTC-resistor is eliminated by the feedback circuit. Between input terminal 19/20 and a terminal of resistor 203 there have been arranged in a manner shown in the Figure two parallel branches having opposite conductivity directions and consisting of a diode 204 and 205, respectively, and a npn-transistor 206 and a pnp-transistor 207, respectively. In addition, a resistor 208 is arranged between the interconnected emitters of the two Darlington circuits and the junction of the emitters of the transistors 206 and 207. When, in response to a high value of the output current, the voltage across resistor 208 increases to a value at which either transistor 206 or transistor 207 becomes conductive the output current is limited to the value $V_j/R_{208}$ ($V_j$ is the junction voltage of the transistors).

In order to prevent the possibility of the voltage at output terminal 23/24 from being increased by external causes, clamping diodes 209 and 210, respectively, which limit the voltage at the voltage of the supply terminals, are arranged between the junction point of the emitters of the transistors 206 and 207 and the supply terminals 33/34 and 35/36, respectively.

What is claimed is:

1. An arrangement for applying signals to a two-wire telephone line, comprising two line control circuits, each having an input for receiving the signals to be applied to the telephone line and each having an output to which two line resistors are connected for connecting the respective outputs to a wire of the telephone line, characterized in that each line control circuit comprises an amplifier circuit having an input stage constituted by an operational amplifier, an intermediate stage constituted by a transistor which is arranged as a voltage amplifier, this intermediate stage being coupled to an output of the operational amplifier, also comprising a power output stage which includes two complementary transistor circuits arranged in a push-pull configuration for connection between the terminals of a d.c. voltage source, and a feedback circuit from an output of the power output stage to an input of the operational amplifier.

2. An arrangement as claimed in claim 1, characterized in that an input circuit is present for applying to the respective inputs of the line control circuits opposite currents which characterize the signals to be applied to the telephone line.

3. An arrangement as claimed in claim 1, one line control circuit being implemented as an inverting and the other line control circuit as a non-inverting amplifier, characterized in that a reference voltage circuit is present for applying a reference voltage to the inverting inputs of each operational amplifier.

4. An arrangement as claimed in claim 1, characterized in that a current limiting circuit which comprises two parallel branches having opposite conductivity directions is arranged between an input and the output of each of the power output stages and that means are present for limiting the voltage at the output of the power output stages to the voltage of the d.c. voltage source.

5. An arrangement as claimed in claim 1, characterized in that each of the input terminals of the power output stages is connected to the positive terminal of the d.c. voltage source via the parallel arrangement of a current source and a resistor with a series capacitor.

* * * * *